United States Patent
Duong et al.

(10) Patent No.: US 12,055,057 B2
(45) Date of Patent: Aug. 6, 2024

(54) ENGINE STRUT FLOW CONTROL

(71) Applicant: Pratt & Whitney Canada Corp., Longueuil (CA)

(72) Inventors: Hien Duong, Mississauga (CA); Vijay Kandasamy, Tamil Nadu (IN)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/091,517

(22) Filed: Dec. 30, 2022

(65) Prior Publication Data

US 2024/0218809 A1   Jul. 4, 2024

(51) Int. Cl.
| F04D 29/68 | (2006.01) |
| B64C 21/02 | (2006.01) |
| F01D 5/14 | (2006.01) |
| F01D 9/02 | (2006.01) |
| F01D 25/16 | (2006.01) |
| F04D 29/32 | (2006.01) |

(52) U.S. Cl.
CPC ............ F01D 25/162 (2013.01); B64C 21/02 (2013.01); B64C 21/025 (2013.01); F01D 5/145 (2013.01); F01D 9/02 (2013.01); F04D 29/682 (2013.01); F04D 29/684 (2013.01); B64C 2230/06 (2013.01); B64C 2230/20 (2013.01); F04D 29/324 (2013.01)

(58) Field of Classification Search
CPC . B64C 2230/06; B64C 2230/20; B64C 21/02; B64C 21/025; F01D 5/145; F04D 29/682; F04D 29/684; F04D 29/324; F04D 29/681; F04D 29/667
See application file for complete search history.

(56) References Cited

U.S. PATENT DOCUMENTS

| 1,499,064 | A | * | 6/1924 | Kuipers | .................... B64C 3/46 244/198 |
| 2,507,611 | A | * | 5/1950 | Pappas | ..................... B64C 21/02 244/198 |
| 3,298,636 | A | * | 1/1967 | Arnholdt | ............... B64C 23/005 244/198 |
| 6,139,259 | A | * | 10/2000 | Ho | ......................... F04D 29/684 415/208.1 |
| 6,464,171 | B2 | * | 10/2002 | Ruffin | ..................... B64C 30/00 244/210 |
| 7,334,998 | B2 | * | 2/2008 | Jones | ........................ F01D 5/16 416/227 R |

(Continued)

FOREIGN PATENT DOCUMENTS

DE       102017118583 A1    2/2019

*Primary Examiner* — Justin D Seabe
*Assistant Examiner* — Behnoush Haghighian
(74) *Attorney, Agent, or Firm* — NORTON ROSE FULBRIGHT CANADA LLP (57) ABSTRACT

A strut includes a strut body extending in a radial direction and defining an airfoil shape in cross-section perpendicular to the radial direction. The airfoil shape includes a leading edge and a trailing edge. An extraction inlet is defined through an exterior surface of the strut body, in fluid communication with an internal conduit of the strut body. An injection outlet is defined through the exterior surface of the strut body, in fluid communication with the internal conduit for fluid communication through the internal conduit from the extraction inlet to the injection outlet.

12 Claims, 5 Drawing Sheets

(56) References Cited

U.S. PATENT DOCUMENTS

| | | | |
|---|---|---|---|
| 8,016,567 B2* | 9/2011 | Praisner | F04D 29/684 |
| | | | 416/231 A |
| 8,133,008 B2* | 3/2012 | Tsuchiya | F01D 5/145 |
| | | | 416/232 |
| 8,444,378 B2* | 5/2013 | Clemen | F02K 3/06 |
| | | | 415/220 |
| 9,422,864 B2 | 8/2016 | Sakekar et al. | |
| 9,488,191 B2 | 11/2016 | Matys | |
| 10,208,621 B2* | 2/2019 | Hoefler | F02C 7/12 |
| 10,683,076 B2* | 6/2020 | Zha | B64C 3/36 |
| 10,683,077 B2* | 6/2020 | Zha | B64C 3/141 |
| 10,815,934 B2* | 10/2020 | Luschek | F02K 3/115 |
| 11,034,430 B2* | 6/2021 | Zha | F15D 1/0055 |
| 11,485,472 B2* | 11/2022 | Zha | B64C 21/025 |
| 11,512,634 B2* | 11/2022 | Yokoyama | F04D 29/284 |
| 11,608,744 B2* | 3/2023 | Gluck | F01D 9/041 |
| 2002/0043589 A1* | 4/2002 | Ruffin | B64C 30/00 |
| | | | 244/130 |
| 2009/0220332 A1* | 9/2009 | Tsuchiya | F01D 5/147 |
| | | | 415/115 |
| 2010/0232954 A1* | 9/2010 | Clemen | F04D 29/541 |
| | | | 415/199.4 |
| 2010/0266385 A1* | 10/2010 | Praisner | F04D 29/684 |
| | | | 415/115 |
| 2011/0052373 A1 | 3/2011 | Sparks | |
| 2018/0171871 A1* | 6/2018 | Duong | F02K 3/06 |
| 2019/0127042 A1* | 5/2019 | Zha | B64C 3/36 |
| 2019/0161158 A1* | 5/2019 | Zha | B64C 3/10 |
| 2019/0185136 A1* | 6/2019 | Zha | F15D 1/0055 |
| 2021/0123380 A1* | 4/2021 | Yokoyama | F01D 5/145 |
| 2021/0284319 A1* | 9/2021 | Zha | B64C 3/10 |
| 2021/0285460 A1* | 9/2021 | Zhou | F04D 29/388 |
| 2022/0010682 A1* | 1/2022 | Gluck | F01D 9/041 |

* cited by examiner

ENGINE STRUT FLOW CONTROL

BACKGROUND

1. Field

The present disclosure relates to aerospace structures, such as the struts that support gas turbine engine cores in bypass ducts of turbofan engines.

2. Description of Related Art

In many turbofan applications the compression system often has stator follow closely by a strut. This stator/strut arrangement, for example can be at a compressor outlet or in the bypass area. Stators are used to remove swirl in flow while the struts provide structural support, e.g. supporting the weight of inboard engine components. In addition, at certain circumferential locations stator/strut for bypass configuration can also be followed by downstream surface cooler and airfoil fairing. Because of the proximity of stator, strut, surface cooler, and/or fairing, their performance is closely couple together.

If there is only one class of stator, then the stator most directly in front of the strut can be back pressured by the strut and often operates on the stall side when compared to its neighbor. The thicker wake from that stator affects the downstream strut and depending on the circumferential position of the strut, flow separation can occur on either side of strut itself as the strut is also back pressured by downstream surface cooler and fairing.

Airfoils operating under positive incidence are also expected to shed thicker wakes. Given the proximity with downstream components wakes are not fully mixed and this in turn can alter incidence of downstream component. Depending on relative circumferential positions between an upstream stator and a downstream strut, flow separation can happen on either side of the downstream strut. The separation increases the back pressure effect on upstream airfoil with the feedback between them persisting by self-feeding until a quasi-steady state is reached. The potential effect is amplified when there are other components downstream (for example surface coolers and/or fairings). The performance is thus said to be closely coupled between all these components.

The conventional techniques have been considered satisfactory for their intended purpose. However, there is an ever present need for improved systems and methods for flow control around struts such as bypass struts. This disclosure provides a solution for this need.

SUMMARY

A strut includes a strut body extending in a radial direction and defining an airfoil shape in cross-section perpendicular to the radial direction. The airfoil shape includes a leading edge and a trailing edge. A chord line is defined extending from the leading edge to the trailing edge. A mid-chord line is defined perpendicular to the chord line at a position along the chord line equidistant from the leading and trailing edges. An extraction inlet is defined through an exterior surface of the strut body, in fluid communication with an internal conduit of the strut body. An injection outlet is defined through the exterior surface of the strut body, in fluid communication with the internal conduit for fluid communication through the internal conduit from the extraction inlet to the injection outlet. At least one of the extraction inlet and the injection outlet is upstream relative to the other relative to the leading and trailing edges. At least one of the extraction inlet and the injection outlet is downstream of the mid-chord line relative to the leading and trailing edges for mitigation of flow separation in flow around the strut body downstream of the mid-chord line.

A maximum thickness line can be defined perpendicular to the chord line. The maximum thickness line can be located at a position along the chord line where the airfoil shape is thickest in a direction perpendicular to the chord line. The maximum thickness line can be upstream relative to the mid-chord line.

The extraction inlet can be downstream of the mid-chord line. The injection outlet can be at least partially upstream relative to the extraction inlet. The injection outlet can be a first injection outlet and a second injection outlet can be included opposite the chord line from the first injection outlet. The second injection outlet can be in fluid communication with the internal conduit to receive flow from the extraction inlet. The injection outlet can be downstream of the mid-chord line. A second extraction inlet can be included opposite the chord line from the first extraction inlet. The second extraction inlet can be in fluid communication with the internal conduit to feed flow into the internal conduit. Each of the first and second extraction inlets can include a respective passive door configured to open and allow flow therethrough depending on pressures outside the respective passive door and in the internal conduit. The injection outlet and the extraction inlet and the injection outlet can both be on one side of the chord line. The injection outlet can be radially inward of the extraction inlet. A second injection outlet can be included, wherein the first and second injection outlets are on one side of the chord line. The first injection outlet can be radially inward of the second injection outlet.

The extraction inlet can be upstream of the mid-chord line, and wherein the injection outlet is at least partially downstream relative to the extraction inlet, e.g. if the extraction inlet is on the leading edge. The injection outlet can be fully downstream of the mid-chord line. The injection outlet and the extraction inlet can both be downstream of the mid-chord line. The extraction inlet can be on the trailing edge.

A gas turbine engine includes an engine core component. An engine duct is outboard of the engine core component. A strut as described above is included, wherein a first radial end of the strut is connected to the engine core component, and wherein a second radial end of the strut opposite from the first radial end is connected to the engine duct.

A set of stator vanes can be included in a flow area upstream of the strut. A surface cooler can be mounted to in inward facing surface of the engine duct downstream of the strut. A fairing can be included downstream of the surface cooler. The fairing can extend radially from the engine core to the engine duct for conveyance of engine fluids between the engine core and systems external to the engine duct.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
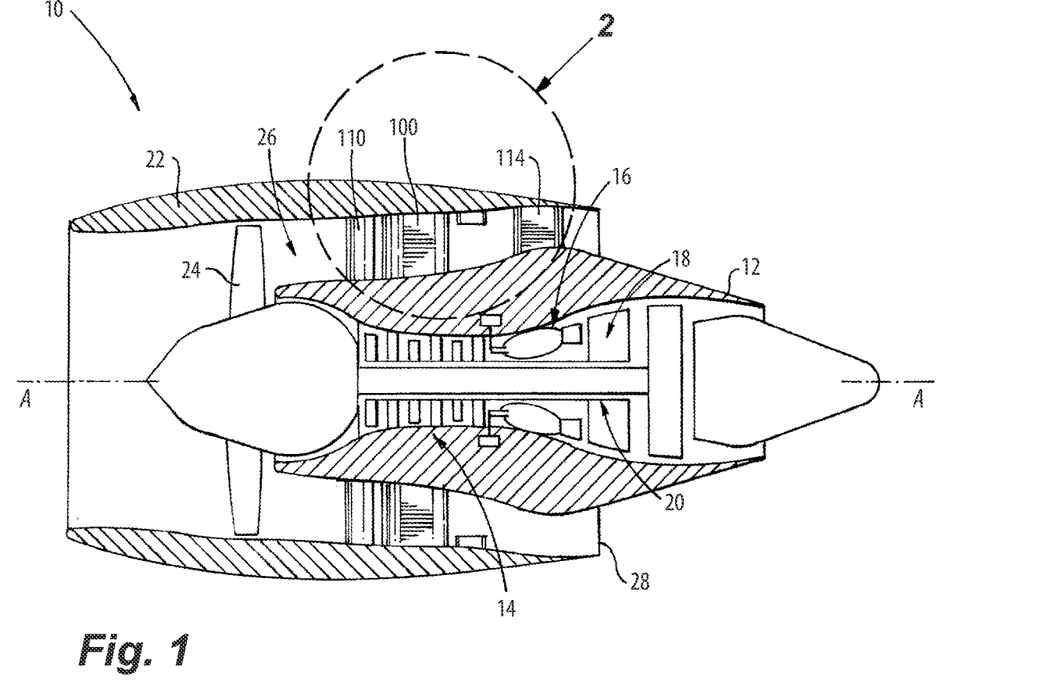
FIG. 1 is a schematic cross-sectional side elevation view of an embodiment of a gas turbine engine constructed in accordance with the present disclosure, showing the strut.

Reference will now be made to the drawings wherein like reference numerals identify similar structural features or aspects of the subject disclosure. For purposes of explanation and illustration, and not limitation, a partial view of an embodiment of a gas turbine engine in accordance with the disclosure is shown in FIG. 1 and is designated generally by reference character 10. Other embodiments of systems in accordance with the disclosure, or aspects thereof, are provided in FIGS. 2-10, as will be described. The systems and methods described herein can be used to mitigate, e.g. reduce or completely eliminate, flow separation from support struts in gas turbine engines.

A gas turbine engine 10 includes an engine core component 12, which includes a compressor section 14 in fluid communication to supply compressed air to a combustor section 16, which is in fluid communication to supply gas generated in the combustor section 16 to a turbine section 18. The turbine section 18 extracts power from the combustion products of the combustor section 16, and this power is provided through one or more rotary shafts 20 to drive the compressor section 14. An engine duct 22 is outboard of the engine core component 12. Some of the rotary power is provided via the one or more shafts 20 to a fan 24, which drives air flow through a bypass area 26 between the engine duct 22 and the engine core component 12. The air from the fan 24 flowing through the bypass area 26 leaves the duct outlet 28 to provide thrust.

Figure 2:
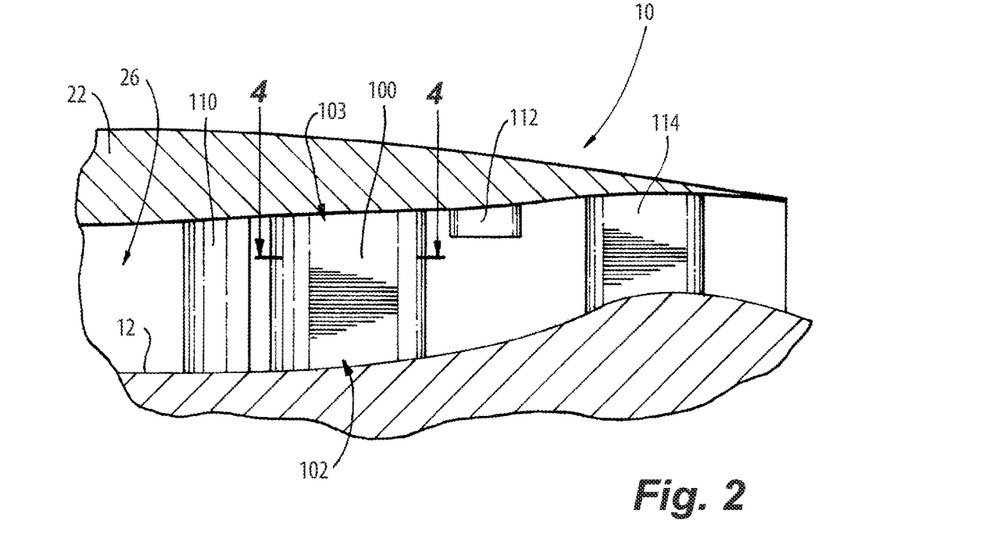
FIG. 2 is a schematic cross-sectional side elevation view of the bypass duct of the gas turbine engine of FIG. 1, showing the stator vanes, the strut, the surface cooler, and the fairing.
Figure 3:
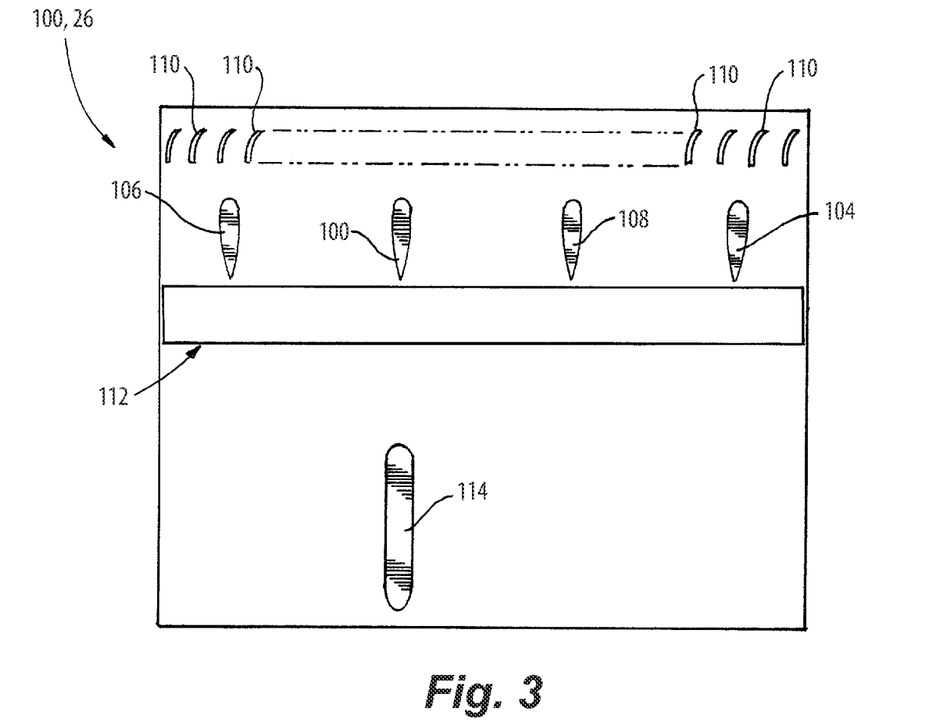
FIG. 3 is a schematic flattened view of the bypass duct of FIG. 2, showing the circumferential and axial positions of the stator vanes, the strut, the surface cooler, and the fairing.

With reference now to FIG. 2, a strut 100 has a first radial end 102 is connected to the engine core component 12. A second radial end 103 of the strut opposite from the first radial end 102 is connected to the engine duct 22. While only one strut 100 is shown in FIG. 2, FIG. 3 schematically shows that there are four struts spaced circumferentially apart at 90-degree intervals around the axis A of the engine 10 (axis A is labeled in FIG. 1), one strut 100 at the top of the bypass area 26, one strut 104 at the bottom of the bypass area 26, one strut 106 on the port side of the bypass area 26, and one strut 108 on the bottom of the bypass area 26. The struts 100, 104, 106, 108 provide structural support to suspend the engine duct 22 about the engine core component 12. While shown and described in the exemplary context of the strut 100 supporting between the engine core 12 and the engine duct 22, it is contemplated that struts as disclosed herein can be used in any other suitable application, such as between an inner and outer wall inside the engine core 12, e.g. in the compressor section 14 or turbine section 12.

With continued reference to FIG. 3, a set of stator vanes 110 is included in the flow area of the bypass area 26 downstream of the fan 22 (labeled in FIG. 1) and upstream of the struts 100, 104, 106, 108. The stator vanes 110 straighten the flow from the fan 22 of FIG. 1 to flow in an axial direction through the bypass area 26. A surface cooler 112 is mounted to in inward facing surface of the engine duct 22 (as shown in FIG. 2) downstream of the struts 100, 104, 106, 108. As shown in FIG. 3, the surface cooler 112 extends in a circumferential direction, e.g. all the way around the circumference of the engine 100. A lone fairing 114 is downstream of the surface cooler 112. The fairing 114 extends radially from the engine core 12 to the engine duct 22 for conveyance of engine fluids between the engine core 12 and systems external to the engine duct 22, e.g. for supplying fuel from a tank external to the engine duct 22 to the combustor section 16 (shown in FIG. 1).

Figure 4:
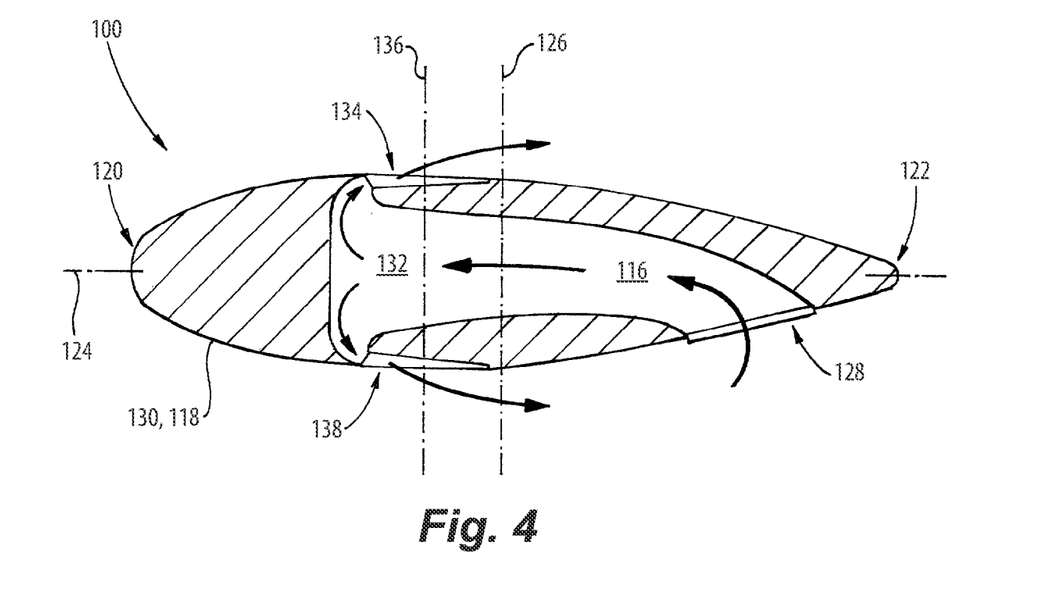
FIG. 4 is a schematic radial cross-sectional view of the strut of FIG. 2, showing the injection outlets and extraction inlet.

The strut includes a strut body 116 extending in the radial direction relative to the engine axis A (labeled in FIG. 1). As shown in FIG. 4 the strut body 116 defines an airfoil shape 118 in cross-section perpendicular to the radial direction. The airfoil shape 118 includes a leading edge 120 and a trailing edge 122. A chord line 124 is defined extending from the leading edge 120 to the trailing edge 122. A mid-chord line 126 is defined perpendicular to the chord line 124 at a position along the chord line equidistant from the leading and trailing edges 120, 122. A maximum thickness line 136 is defined perpendicular to the chord line 124. The maximum thickness line 136 is located at a position along the chord line 124 where the airfoil shape 118 is thickest in a direction perpendicular to the chord line 124. The maximum thickness line 136 is upstream relative to the mid-chord line 126.

With continued reference to FIG. 4, an extraction inlet 128 is defined through an exterior surface 130 of the strut body, in fluid communication with an internal conduit 132 of the strut body 116. An injection outlet 134 is defined through the exterior surface 130 of the strut body 118, in fluid communication with the internal conduit 132 for fluid communication through the internal conduit 132 from the extraction inlet 128 to the injection outlet 134. Those skilled in the art will readily appreciate that conduit 132 can include any suitable type of conduit, including the conduit 132 can simply include any passage through a hollow interior of the strut body 116.

The injection outlet 134 is upstream of the extraction inlet 128 other relative to the leading and trailing edges 120, 122. The extraction inlet 128 is fully downstream of the mid-chord line 126, wherein no portion of the extraction inlet 128 is upstream of the mid-chord line 124, relative to the leading and trailing edges 120, 122. Given the pressure outside of the strut 100 is higher at the extraction inlet 128 that the pressure outside of the strut 100 at the injection outlet 134, air will flow from the extraction inlet 128, through the internal conduit 132, and out through the injection outlet 134. This mitigates flow separation from the strut 100 in the vicinity of the extraction inlet 128. Mitigating flow separation means reducing flow separation in the flow around the strut body downstream of the mid-chord line, relative to what it would be without the flow through the internal conduit 132. Mitigating flow separation includes reduction and complete elimination of such flow separation. The mode of operation in FIG. 4 is to extract air from the would-be separation zone, reducing or eliminating the separation zone.

In FIG. 4, the extraction inlet 128 is downstream of the mid-chord line 126. The injection outlet 134 is at least partially upstream relative to the extraction inlet 128 relative to the leading and trailing edges 120, 122. In the case of FIG. 4, the injection outlet 134 is at least partially upstream of the mid-chord line 126, and is fully upstream of the extraction inlet 128, relative to the leading and trailing edges 120, 122. A second injection outlet 138 opposite the chord line 124 from the first injection outlet 134 is also in fluid communication with the internal conduit 132 to receive flow from the extraction inlet 128. Flow through the internal conduit 132 out the two injection outlets 134, 138 is indicated in FIG. 4 with the double-headed flow arrow.

Figure 5:
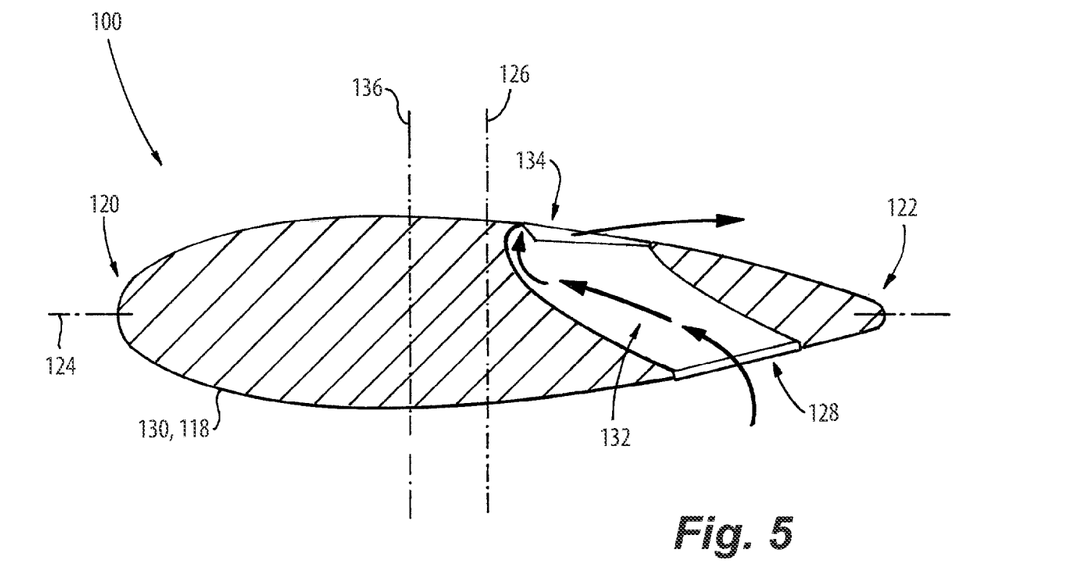
FIG. 5 is a schematic radial cross-sectional view of the strut of FIG. 2, showing an embodiment with both the injection outlet and the extraction inlet downstream of the mid-chord line.

With reference now to FIG. 5, an embodiment of the strut 100 is shown, wherein the injection outlet 134 is downstream of the mid-chord line 126 and of the maximum thickness line 134, relative to the leading and trailing edges 120, 122, but is still nonetheless at least partially upstream of the extraction inlet 128. The flow through the internal conduit 132 is indicated in FIG. 5 with the large flow arrow, and the operation of suctioning relatively high pressure air into the extraction inlet 128 to mitigate flow separation in the vicinity of extraction inlet 128 is similar to the operation described above with respect to FIG. 4.

Figure 6:
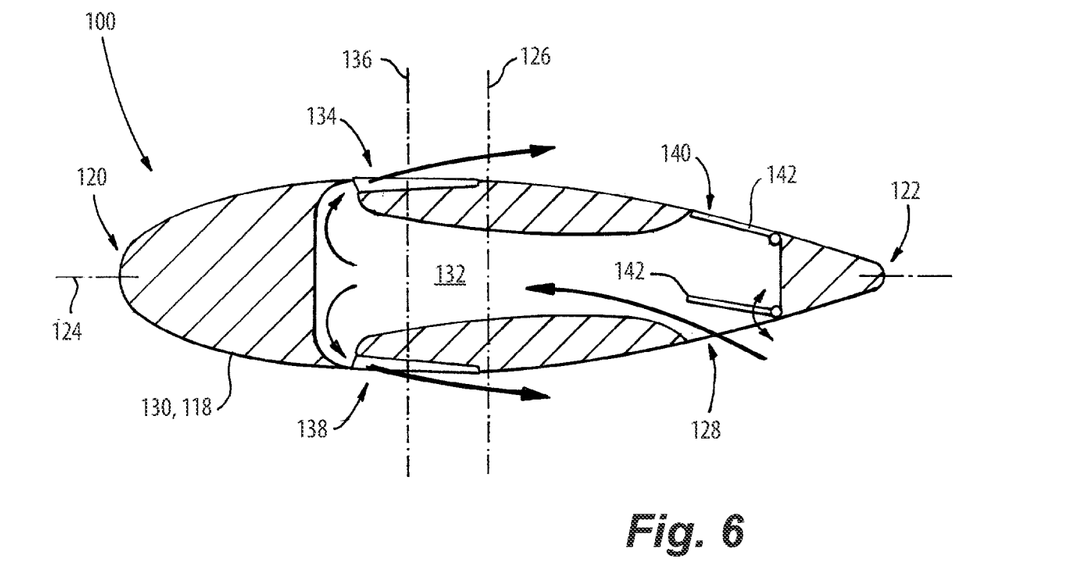
FIG. 6 is a schematic radial cross-sectional view of the strut of FIG. 2, showing an embodiment with passive doors on the extraction inlets.

With respect now to FIG. 6, there is shown an embodiment that like the embodiment shown in FIG. 1, has two injection outlets 134, 138. However, the embodiment of FIG. 6 includes a second extraction inlet 140 is opposite the chord line 124 from the first extraction inlet 128. The second extraction inlets 128, 140 are both in fluid communication with the internal conduit 132 to feed flow into the internal conduit 132 for injection out through the injection outlets 134, 138. Each of the first and second extraction inlets 128, 140 includes a respective passive door 142 configured to open and allow flow therethrough depending on pressures outside the respective passive door 142 and in the internal conduit 132. This allows the extraction to occur on whatever side of the strut 100 is needed, e.g. as the tendency to otherwise form a separation zone changes sides between the side of the extraction inlet 128 or the side of the extraction inlet 140.

Figure 7:
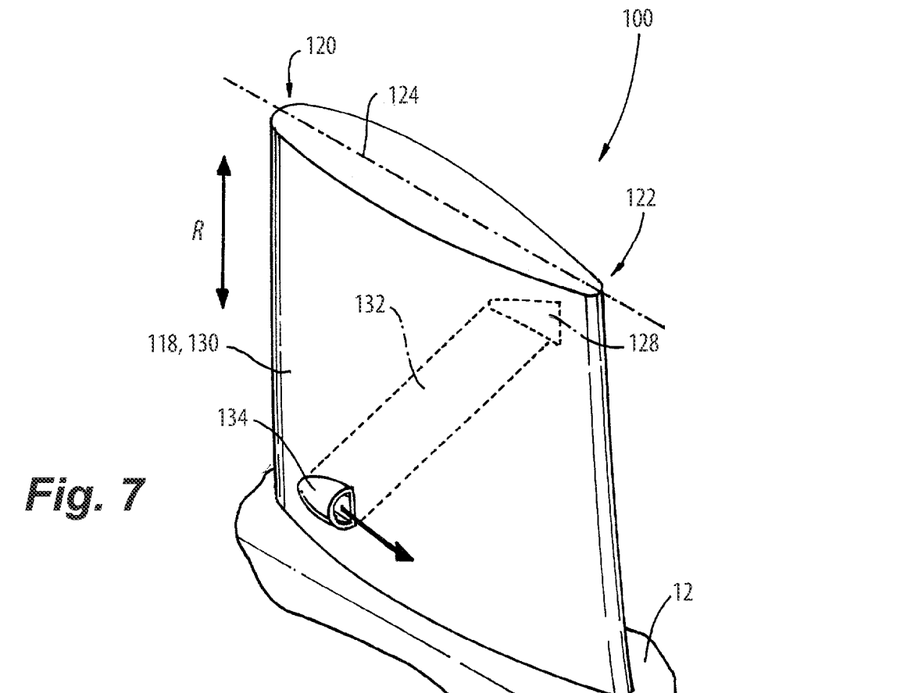
FIG. 7 is a schematic perspective view of the strut of FIG. 2, showing an embodiment with the extraction inlet radially outward from the injection outlet.
Figure 8:
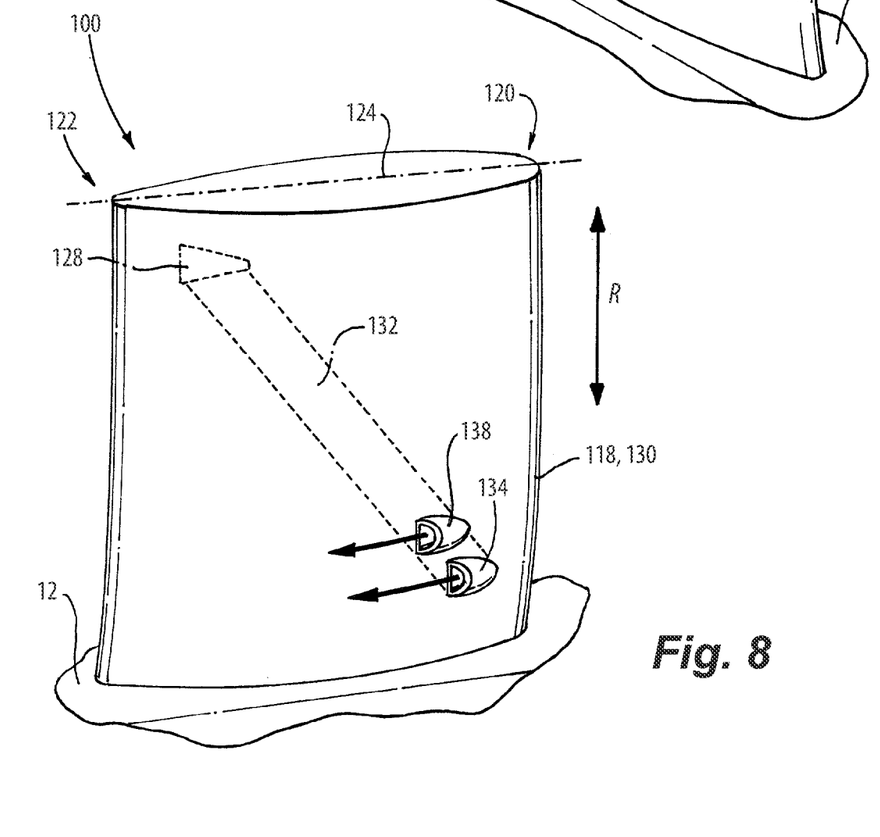
FIG. 8 is a schematic perspective view of the strut of FIG. 2, showing two injection outlets on one side of the strut, with different radial locations.

With reference to FIG. 7, an embodiment of the strut 100 is shown, wherein the extraction inlet 128 and the injection outlet 134 are both on one side of the chord line 124, while the upstream/downstream location of the extraction inlet 128 and injection outlet 134 are similar to that described above with respect to FIG. 4. The injection outlet 134 is radially inward in the radial direction R relative to the extraction inlet 128. Optionally, additional inlets and/or outlets can be similarly positioned, e.g. mirrored over the chord line 124, on the opposite side of the strut of FIG. 6, e.g. the side not fully visible in FIG. 6. The internal conduit 132 is indicated in FIG. 7 in broken lines, and extends diagonally across the both radial direction R and the upstream downstream direction of the chord line 124. As shown in FIG. 8, a second injection outlet 138 is included, wherein the first and second injection outlets 134, 138 are on one side of the chord line 124. The first injection outlet 134 is radially inward of the second injection outlet 138 in the radial direction R. The extraction inlet 128 and internal conduit 132 are shown broken lines in FIG. 8 because the extraction inlet 128 is on the side of the strut 100 not fully visible in FIG. 8, and the upstream/downstream position and radial position of the extraction inlet 128 are the same as shown in FIG. 7.

Figure 9:
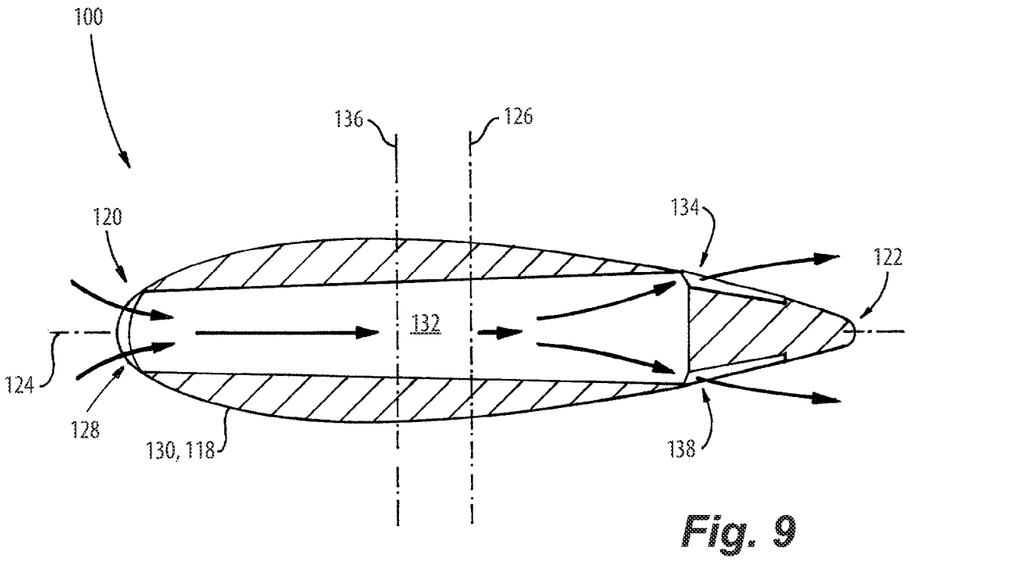
FIG. 9 is a schematic radial cross-sectional view of the strut of FIG. 2, showing an embodiment with an extraction inlet on the leading edge, and downstream injection outlets.
Figure 10:
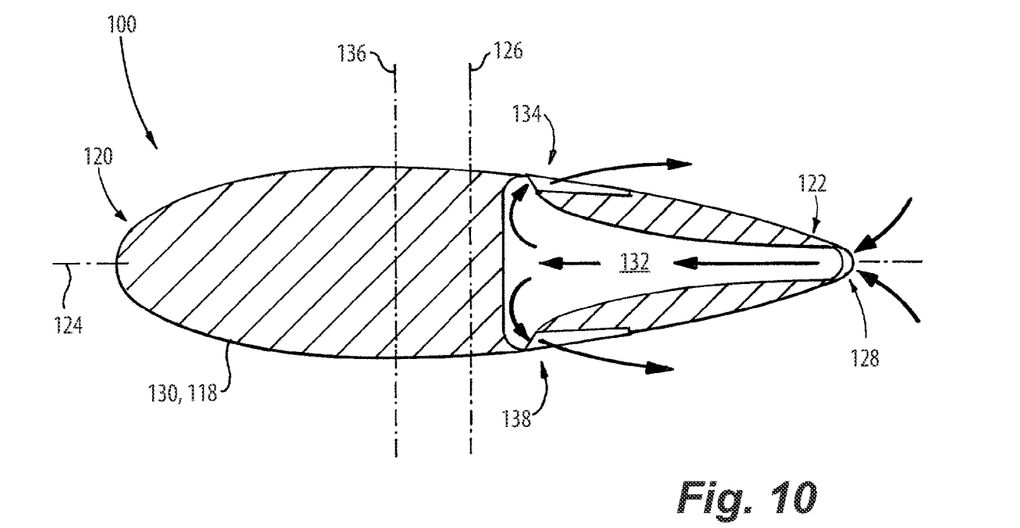
FIG. 10 is a schematic radial cross-section view of the strut of FIG. 2, showing an embodiment with an extraction inlet on the trailing edge.

The foregoing embodiments function on the principle of extracting air from the area of a would-be separation to mitigate the pressure patterns that cause flow separation from the strut 100. With reference now to FIGS. 9 and 10, it is also possible to mitigate would-be flow separation from the strut 100 by injecting air into the area of the would-be separation. As shown in FIG. 9, the extraction inlet 128 is upstream of the mid-chord line 126, and wherein the injection outlet 134 is at least partially downstream relative to the extraction inlet 128. Specifically in FIG. 9, the extraction inlet 128 is on the leading edge 120, and two injection outlets 134, 138 are fully downstream of the mid-chord line 126 and of the maximum thickness line 136. The embodiment of FIG. 10 operates on the same principle as in FIG. 9, although the extraction inlet 128 and the injection outlets 134, 138 are all fully downstream of the mid-chord line 126 and of the maximum thickness line 136. In FIG. 10, the extraction inlet 128 is on the trailing edge 122, and the injection outlets 134, 128 are upstream of the extraction inlet relative to the leading and trailing edges 120, 122. Due to the high pressure at the trailing edge 128, and the relatively low pressure where the injection outlets 134, 138 are positioned, flow through the internal conduit is in the direction indicated in FIG. 10 with the flow arrows.

Embodiments as disclosed herein can mitigate flow separation from structural struts, and depending on where that separation tends to occur in a given duct design, various embodiments as disclosed herein can be used with inlet and outlet positions for either extracting the separation or injecting into the separation to mitigate in that given design. The features disclosed herein can be incorporated into strut designs with litter or no gain in cost or weight. Because they mitigate flow separation from the structural struts, systems and methods as disclosed herein promote better flow, e.g. in the duct area downstream of the struts, which promotes engine performance and range. A surface cooler downstream of the struts will receive more even cooling flow than with traditional strut configurations. The features disclosed herein can be incorporated into existing designs with relatively little need for re-certification cost. And the features disclosed herein can be manufactured with current tools and methods.

The methods and systems of the present disclosure, as described above and shown in the drawings, provide for mitigation of, e.g. reducing or completely eliminating, flow separation from support struts in gas turbine engines. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An aircraft engine comprising:
   an engine core defining an engine axis extending longitudinally;

a compressor duct located radially outward of the engine core component and directing air therethrough along an airflow direction;

a strut extending in a radial direction through the compressor duct from an inner end of the strut that is connected to the engine core to an outer end of the strut that is connected to the compressor duct, the strut including a strut body defining an airfoil shape in a cross-sectional plane perpendicular to the radial direction, wherein the airfoil shape includes a leading edge located at an upstream end of the airfoil relative to the airflow direction and a trailing edge located at a downstream end of the airfoil relative to the airflow direction, wherein a chord line is defined as extending through the airfoil in the cross-sectional plane from the leading edge to the trailing edge, and wherein a mid-chord line is defined perpendicular to the chord line at a position along the chord line equidistant between the leading edge and the trailing edges;

an extraction inlet defined through an exterior surface of the strut body, in fluid communication with an internal conduit of the strut body; and an injection outlet defined through the exterior surface of the strut body, in fluid communication with the internal conduit for fluid communication through the internal conduit from the extraction inlet to the injection outlet, the injection outlet comprising a first injection outlet and a second injection outlet both in fluid communication with the extraction inlet via the internal conduit, an entirety of the first injection outlet being disposed on one side of the chord line, and an entirety of the second injection outlet being disposed on an opposite side the chord line from the first injection outlet;

wherein at least one of the extraction inlet and the injection outlet is upstream relative to the other one of the at least one of the extraction inlet and the injection outlet relative to the leading and trailing edges, and wherein at least one of the extraction inlet and the injection outlet is downstream of the mid-chord line relative to the leading and trailing edges and configured for mitigation of flow separation in flow around the strut body downstream of the mid-chord line.

2. The strut as recited in claim 1, wherein a maximum thickness line is defined perpendicular to the chord line, and wherein the maximum thickness line is located at a position along the chord line where the airfoil shape is thickest in a direction perpendicular to the chord line, wherein the maximum thickness line is upstream relative to the mid-chord line.

3. The strut as recited in claim 1, wherein the first injection outlet and the second injection outlet are located in the exterior surface of the strut body at a common fore-aft position between the leading edge and the trailing edge.

4. The strut as recited in claim 1, wherein the injection outlet is downstream of the mid-chord line.

5. The strut as recited in claim 1, wherein the extraction inlet is located on the same side of the chord line as one of the first injection outlet and the second injection outlet.

6. The strut as recited in claim 1, wherein the extraction inlet is upstream of the mid-chord line, and wherein the injection outlet is fully downstream relative to the extraction inlet.

7. The strut as recited in claim 6, wherein the extraction inlet is on the leading edge.

8. The strut as recited in claim 6, wherein the injection outlet is fully downstream of the mid-chord line.

9. The gas turbine engine as recited in claim 1, wherein a set of stator vanes is located of the strut.

10. The gas turbine engine as recited in claim 9, further comprising a surface cooler mounted to in inward facing surface of the engine duct downstream of the strut.

11. The gas turbine engine as recited in claim 10, further comprising a fairing downstream of the surface cooler, the fairing extending radially from the engine core to the compressor duct for conveyance of engine fluids between the engine core and systems external to the compressor duct.

12. The gas turbine engine as recited in claim 3, wherein the first injection outlet and the second injection outlet are symmetrical with respect to the chord line.

\* \* \* \* \*